Patented July 10, 1951

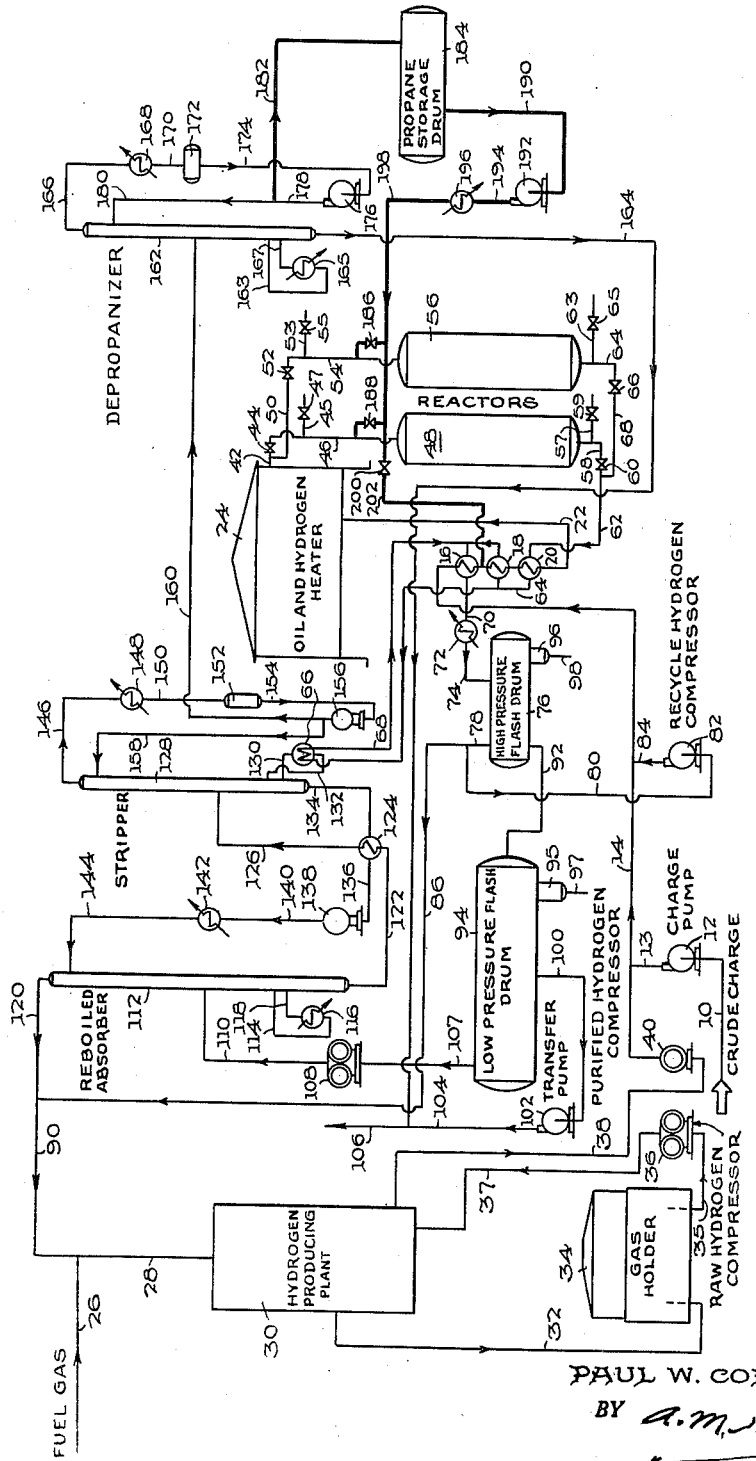

2,560,415

UNITED STATES PATENT OFFICE 2,560,415

HYDRODESULFURIZATION PROCESS

Paul W. Cornell, Mount Lebanon, Pa., assignor to Gulf Oil Corporation, Pittsburgh, Pa., a corporation of Pennsylvania Application December 14, 1948, Serial No. 65,153

4 Claims. (Cl. 196—28)

This invention relates to a method for repressurizing a contact hydrodesulfurization process and more particularly to a method of repressurizing a hydrodesulfurization system after the contact agent has been regenerated by the use of readily liquefiable low boiling hydrocarbon gas.

The contact or adsorption hydrodesulfurization process has furnished the refiner of crude petroleum with one of the most efficient methods of removing sulfur from sulfur-bearing charge stocks. As described in U. S. applications Ser. Nos. 699,671 and 699,672 filed September 27, 1946, by W. A. Horne and J. F. Junge (now Patents 2,516,876 and 2,516,877, respectively), this process consists in contacting a petroleum hydrocarbon and hydrogen-containing gas mixture in the presence of a contact agent comprising an iron group metal oxide such as nickel oxide on a carrier at an elevated temperature and pressure. The process is continued until substantial amounts of hydrogen sulfide appear in the effluent at which time the process is stopped and the contact agent regenerated to substantially its original form. Following the regeneration the system is repressured and once again put on-stream and the process continued as before.

It had been found that on repressurizing the system with a hydrogen-containing gas, such as a mixture of hydrogen and hydrocarbon charge the hydrogen initially reacts with the iron group oxide contact agent to initially reduce a minor amount of the metal oxide to free metal. While minor amounts of the oxide are thus reduced there is sufficient partial removal of hydrogen to upset the pressure balance in the system. Due to this partial removal of hydrogen, the pressure in the system falls causing undesirable fluctuations in pressure. The practical result of this has been the requirement of an enlargement of the hydrogen producing and compressing equipment and/or an increase in the facilities for storing excess amounts of hydrogen. Consequently, a large expenditure is necessitated for additional hydrogen apparatus to meet the relatively short repressuring and initial on-stream periods when the consumption of hydrogen is greatly in excess of average.

An object of the present invention is to provide a method whereby contact hydrodesulfurization systems may be repressurized after regeneration without substantial pressure fluctuation or undue hydrogen consumption.

A further object of the present invention is to provide a method whereby contact hydrodesulfurization systems may be put on-stream after regeneration without initial undue hydrogen consumption.

A still further object of the present invention is to provide a method whereby contact hydrodesulfurization processes are repressurized without excessive pressure drops.

Another object of the present invention is to provide a method whereby contact hydrodesulfurization processes are put on-stream without excessive falling of the pressure of the system.

Further objects will appear hereafter.

These and other objects are achieved by the present invention which comprises an improvement for a contact absorption hydrodesulfurization process in which high boiling vaporous petroleum hydrocarbons containing sulfur, and hydrogen-containing gases under pressure, are passed together through a chamber containing a contact agent comprising substantially an iron group metal oxide on a carrier, which contact agent absorbs the sulfur content of the petroleum hydrocarbons with a concomitant conversion of the iron group metal oxide into iron group metal sulfide, following which the contact agent is regenerated to susbtantially its original form and the contact absorption hydrocarbon process renewed; the said improvement comprising avoiding pressure drops and surges when the contact absorption hydrodesulfurization process is renewed by bringing the system to substantially the operating pressure after the contact agent has been regenerated by introducing a readily liquefiable low boiling saturated hydrocarbon gas into the chamber and when substantially the desired pressure has been attained, again contacting the petroleum hydrocarbons and hydrogen-containing gas with the iron group metal oxide in the pressured-up chamber.

The present application is similar to the aforementioned Horne and Junge applications as regards the operating conditions and type contact. The present application is an advance over the above applications in that I have discovered that by repressurizing the system following regeneration by the use of readily liquefiable low boiling hydrocarbon gas instead of hydrogen-containing gas the pressure drop heretofore encountered can be avoided. Also, if readily liquefiable low boiling hydrocarbon gas is used in conjunction with hydrogen-containing gas and petroleum hydrocarbon vapor at the commencement of the on-stream cycle, the initial on-stream pressure drop due to hydrogen consumption can likewise be avoided.

The reaction takes place at varying temperatures, pressures and space velocities with the optimum conditions depending on the type charge stock that is used. For example, with low boiling hydrocarbons such as those normally liquid petroleum fractions having as ASTM end point below 600° F., such as straight run or cracked gasolines and naphtha, the temperature will usually lie between 600° and 800° F. I have found that at temperatures below 600° F., the desulfurization activity of the contact diminishes whereas with temperatures higher than 800° F. excessive cracking reactions result in decreased product recovery and rapid coke formation which deactivates the contact. I have further found that the optimum pressures lie between 100 and 500 p. s. i. g. At pressures below 100 p. s. i. g. the partial pressure of hydrogen is not sufficient to maintain desulfurization activity nor to suppress cracking reactions which result in coke formation. Increasing the pressure above 500 p. s. i. g. results in only a slight incremental gain in desulfurization, and a decrease in the bromine number of the end product gasoline and is thus not commercially desirable. The preferred space velocities lie between 1.0 and 6.0 liquid volumes of charge per hour per volume of contact agent. Space velocities below 1.0 result in excessive cracking and olefin saturation reactions caused by the long contact time whereas at space velocities above 6.0 the contact time is too short to provide sufficient desulfurization.

This invention can be applied with exceptional success to high boiling petroleum hydrocarbon oil such as total crude as well as topped or reduced crude. These terms may be defined as follows: "Total crude" is defined as naturally occurring petroleum oil which has not been processed in any manner but has been or preferably should be separated from water or sediment and desalted. "Topped or reduced crude" is defined as the residual petroleum oil resulting from removal of all or some of the straight run fractions such as gas, gasoline, kerosene, naphtha, furnace oil, gas oil, etc. which are normally removed from the above-defined total crude by the process of atmospheric and/or vacuum topping or distillation. Charge stocks such as total crude which has been diluted or admixed with lower boiling straight run or cracked petroleum fractions including gases are also included. Diluents of this kind may be required in processing low gravity crudes such as some of those from Mississippi as well as those from Kuwait. Diluents may also be necessary and preferred in desulfurizing topped or reduced crudes. The purpose of this diluent is to assist vaporization of the heavier constituents of the charge stock. In some cases it may be desirable to admix steam with the charge stock to assist vaporization. Preferred operating conditions for the aforementioned high boiling petroleum hydrocarbons may vary within certain ranges depending upon the charge stock.

I have found the optimum temperature range to be from 750 to 950° F. for high boiling petroleum hydrocarbons. At temperatures below 750° F. the desulfurizing activity of the contact diminishes whereas at temperatures greater than 950° F. excessive cracking actions result in decreased product recovery and rapid coke formation which deactivates the contact. I have further ascertained the preferred pressure range to be between 100 and 1000 p. s. i. g. With pressures below 100 p. s. i. g. it appears that the partial pressure of hydrogen is not sufficient to maintain desulfurizing activity nor to suppress cracking reactions which result in coke formation. Increasing the pressure above 1000 p. s. i. g. results in only a slight incremental gain in desulfurization and is thus not commercially desirable. The space velocity range which I prefer to employ is 0.2 to 6.0 volumes of charge per hour per volume of contact agent. A space velocity below the former causes excessive cracking reactions due to the long contact time, while space velocities above 6.0 are too short to allow sufficient desulfurization. I have found that best results are obtained with a hydrogen ratio to petroleum hydrocarbon greater than 300 s. c. f./bbl.

As disclosed in the aforementioned Horne and Junge applications, the contact comprises a substantial amount of an iron group oxide i. e. nickel, iron or cobalt oxides supported on a carrier such as alumina. Other carriers which have been found to be applicable include kieselguhr, silica gel, aluminum silicates, silica-aluminas, Alfrax, Magnesol, Porocel, bauxite, diatomaceous earth, etc. The contact agent may be prepared by any of the known methods such as single or multiple impregnation, coprecipitation, adsorption from a colloidal solution, etc.

The present process is best understood by an examination of the accompanying figure. Crude charge enters the system through line 10 and passes by means of charge pump 12, through line 13, and line 14 into heat exchangers 16, 18 and 20. The charge then passes by means of line 22 into oil and hydrogen heater 24.

The hydrogen is prepared from fuel gas which enters the system from line 26 through line 28 into hydrogen producing plant 30. The hydrogen may most advantageously be produced by means of the conventional reforming and shift reactions, in which the fuel gas is burned in the presence of steam, and the carbon monoxide formed in the reaction is converted to carbon dioxide. The hydrogen plus carbon dioxide produced in plant 30 is passed by means of line 32 into gas holder 34 where it may be stored before being returned to plant 30 by passing it through line 35, raw hydrogen compressor 36, and line 37. In hydrogen producing plant 30, the carbon dioxide is removed by conventional means, and the purified and compressed hydrogen is then removed from hydrogen producing plant 30 by means of line 38, and passes through compressor pump 40 to line 14 where it joins the crude petroleum charge coming from line 13. The hydrogen plus charge likewise passes from line 14 through heat exchangers 16, 18 and 20 into line 22 and then into oil and hydrogen heater 24. In oil and hydrogen heater 24 the charge and hydrogen are heated to reaction temperature and then passed by means of line 42, valve 44 and line 46 into reactor 48. Alternatively, valve 44 may be closed and the oil and hydrogen mixture passed from heater 24 through line 42 into line 50, valve 52, line 54 and thence into reactor 56. By alternating, one reactor may always be kept on-stream while the other is being purged, or regenerated. While only two reactors are shown, a greater number may be provided so that one or more may be in the processing stage, while the remaining reactors are at other stages in the reaction cycle. In the reactors the petroleum hydrocarbons are hydrodesulfurized by passing over the contact agent comprising substantial amounts of an iron group metal oxide on a carrier, thereby causing the sulfur to be removed from the charge stock by combination as sulfide with the contact agent kept in the reactors. The desulfurized product is passed from reactor 48 into line 58, valve 60 and into line 62. If reactor 56 is on stream desulfurized product from reactor 56 is passed by means of line 64, valve 66, and line 68 into line 62. The desulfurized product in line 62 is passed in heat exchanger relationship through heat exchanger 20, and line 64, where a portion is diverted through heat exchanger 66 and line 68 while the remainder is passed through heat exchanger 18. The product from heat exchangers 18 and 66 are then passed in heat exchanger relationship through heat exchanger 16 into line 70, condenser 72, line 74 into high pressure flash drum 76.

In high pressure flash drum 76 the recycle gas is separated from the desulfurized liquid product. The recycle gas passes through line 78 where it is apportioned. Part of the gas from line 78 passes into line 80 and then into recycle hydrogen compressor 82 and line 84 from which it joins the charge stock hydrogen mixture in line 14. The remaining portion of the recycle gas is passed from line 78 into line 86, line 90 and line 28 where it joins the fuel gas entering the system from line 26. From line 28 the fuel recycle gas mixture is passed to hydrogen producing plant 30 for hydrogen manufacture.

The desulfurized liquid product from high pressure flash drum 76 is passed through line 92 into low pressure flash drum 94. Any water present in high pressure flash drum 76 is removed from the system by means of water separator 96 and pipe 98. In low pressure flash drum 94 the liquid product is removed by means of line 100 and transfer pump 102 to line 104. From line 104 the product is removed from the system by means of line 106.

The water from low pressure flash drum 94 is removed by water separator 95 and line 97. The vapors from low pressure flash drum 94 are passed through line 107, absorber gas compressor 108, line 110 into reboiled absorber 112. Reboiled absorber 112 is kept under proper distillation conditions by means of line 114, vaporizer 116 and line 118. The lowest boiling constituents such as methane and ethylene from low pressure flash drum 94 are removed as overhead from reboiled absorber 112, passed into line 120 and thence into line 90, line 28 into hydrogen producing plant 30. In reboiled absorber 112 the normally liquefiable hydrocarbons as well as those liquefiable under pressure such as the three-carbon hydrocarbons and above are removed together with the lean oil in which they are dissolved as bottoms by means of line 122, heat exchanger 124, line 126, passing therefrom into stripper 128.

The distilling conditions in stripper 128 are maintained by means of line 130, heat exchanger 66 and line 132. The lean oil bottoms from stripper 128 are removed by means of line 134, pass in heat exchanger relationship through heat exchanger 124, line 136, lean oil pump 138, line 140, cooler 142, line 144 into reboiled absorber 112 for use as absorption oil. The overhead vapors from stripper 128 are discharged through line 146, condensed in condenser 148 and then passed through line 150, reflux drum 152, line 154 into stripper reflux pump 156 where a portion of the overhead is returned as reflux to stripper 128 by means of line 158. The remainder of the overhead from stripper 128 is removed through line 160 and passed to depropanizer 162.

The distillation conditions in depropanizer 162 are maintained by means of line 163, vaporizer 165 and line 167. The bottoms from the depropanizer 162 comprising desulfurized product are removed by means of line 164 and passed to line 106 where they join the desulfurized product from low pressure flash drum 94 and are removed from the system. The overhead from depropanizer 162 comprising liquefiable hydrocarbon gases such as propane is removed by line 166 and condensed in condenser 168. The condensate is then passed through line 170, reflux drum 172, line 174 into pump 176. From pump 176 the overhead condensate from depropanizer 162 passes into line 178 where a portion of it is returned as reflux to depropanizer 162 by means of line 180. The remainder of the depropanizer overhead condensate in line 178 is passed by means of line 182 to propane storage drum 184 where it is stored in the liquid state.

At the completion of the on-stream cycle, which may be determined by the appearance of substantial amounts of hydrogen sulfide in the effluent, regeneration of the contact agent becomes necessary. In some instances it may be feasible to commence regeneration at another time this to be determined by the content of the carbon residue of the product. The on-stream cycle is stopped by closing valves 44 or 52. The contact beds are then regenerated by first purging the reactors with an inert substance such as steam. The purpose of the purge is to recover valuable hydrocarbons which remain in the contact bed. The inert substance is introduced into reactor 48 by means of lines 45 and 46 and may leave the reactor through line 58, valve 60 and line 62, or through line 58 and a valve, condenser, and lines (not shown) to drum 94. The inert substance for reactor 56 is introduced by means of lines 53 and 54 and leaves the reactor by means of line 64, valve 66, line 68 and line 62, or through line 64, and a valve, condenser and lines (not shown) to drum 94. Following the purge, valves 60 or 66 are closed and regenerating gas such as oxygen or an oxygen-containing gas such as air is introduced into reactors 48 or 56 from lines 45 and 46, or 53 and 54 by opening valves 47 or 55. In reactor 48 or 56 the contact bed is oxidized and the sulfur on the contact surface is removed as sulfur dioxide. This regeneration product gas is removed from reactors 48 or 56 by their corresponding lines 57 and 63, and valves 59 and 65. The sulfur dioxide in this gas may be recovered in conventional manner such as by solvent absorption and stripping. The sulfur dioxide free regeneration off-gas may then serve to dilute the first regeneration gas admitted to the reactors. Alternatively, the sulfide dioxide gas containing regeneration off-gas may serve to dilute the fresh regeneration gas. After regeneration is complete, which may readily be determined by the fact that the contact agent is substantially free of sulfur and is once again in the oxide form, the oxidizing gas is shut off and the reactor steamed to remove any oxygen present. The reactor is then blocked off by closing valves 47 or 55. Also, valves 59 or 65 are likewise closed.

At this point reactor 48 or 56 is brought to about on-stream pressure by the use of applicant's invention (in the accompanying drawing applicant's invention appears in heavy line). Liquid propane is released from propane storage drum 184 by opening valves 186 and 188 and passing the liquid propane through line 190, pump 192, line 194 into vaporizer 196. In vaporizer 196 the liquid propane is gasified and in the gaseous form is conducted to reactors 48 or 56 by means of line 198 and respective valves 188 and 186. When the system has been brought up to the desired pressure, which will usually approximate on-stream pressure, valve 188 or 186 is closed and valves 44 or 52 and 60 or 66 are opened and flow is established through the reactor after which the other reactor may be blocked off for flushing and regeneration. Furthermore, valve 200 is likewise opened. As a consequence, a mixture of charge stock, hydrogen-containing gas and regulated amounts of propane are introduced into the system. The propane joins the charge stock and hydrogen in line 14 after passing through valve 200 and line 202. I have found that introducing regulated amounts of propane at the commencement of the on-stream cycle, when the hydrogen consumption would otherwise be higher than average, as well as prior to placing the reactor on-stream, further minimizes the surges resulting from the abnormal demand for hydrogen. After the system has been on-stream for some time, valve 200 is closed and the purity of the charge stock-hydrogen stream is maintained as before.

The above illustration has been given with the readily liquefiable low boiling hydorcarbon gas being propane. However, it is to be understood that any readily liquefiable hydrocarbon gas can be used. It is preferred to employ a gas formed in the reaction. The propane cut discussed in the aforementioned description is substantially propane but may contain such materials as butane and ethane and minor amounts of methane. In place of propane a butane cut containing substantially butane or mixtures of a butane and propane cut may be employed. However, since for the production of gasoline, maximum butane retention in the crude is desirable, and since for minimizing losses in the storage of the treated crude product, maximum propane removal is desirable, depropanizing facilities may be a customary part of the unit and the liquid overhead product from such depropanizers referred to herein as "propane" would be available and hence be the preferred material for use.

Although it is to be understood that the practice outlined in the aforementioned illustration will usually furnish the best results and is to be considered the preferred procedure, the invention may be modified in certain cases by limiting the use of the liquefiable low boiling hydrocarbon gas solely to the repressurizing of the reactor. In these cases the step of diluting the recycle charge stock-hydrogen-containing gas mixture with liquefiable low boiling hydrocarbons is omitted. Alternatively, in rare cases it may be desirable to repressurize the system with one substance, and to dilute the charge stock, and hydrogen-containing gas mixture with another. These variations as well as other obvious modifications in apparatus or process readily apparent to one skilled in the art are to be considered within the scope of my invention.

This invention permits the repressurizing of hydrodesulfurizing systems in an economical and advantageous manner and avoids disturbance of the temperature and pressure balances due to initial hydrogen consumption encountered in prior systems. Furthermore, the expensive enlargement of hydorgen-producing, compression and storage facilities is replaced by the relatively inexpensive use of the liquefiable hydrocarbon system shown in applicant's specification. This affords a major economy in both the initial cost and in the operating expense of the contact hydrodesulfurization process inasmuch as it is cheaper and facile to store and handle a liquefiable substance such as a liquefiable hydrocarbon than a highly explosive dangerous gas like hydrogen under high pressure.

In addition, due to the virtual elimination of pressure surges there will be a lengthening of the useful life of the contact as a result of the diminution of the stresses and strains concomitant with the pressure surges. Likewise as a result of this invention there will be a prolongation of the life of the mechanical equipment involved in the process, due to the elimination of sudden severe surges.

What I claim is:

1. In a contact absorption hydrodesulfurization process in which a vaporous high boiling petroleum hydrocarbon containing sulfur, and hydrogen-containing gas under pressure are passed together through a chamber containing a contact agent comprising substantially an iron group metal oxide on a carrier, which contact agent absorbs the sulfur content of the petroleum hydrocarbon with a concomitant conversion of the iron group metal oxide into iron group metal sulfide, following which the contact agent is regenerated to substantially its original form and the contact absorption hydrodesulfurization process renewed, the improvement for avoiding pressure drops and surges when the contact absorption hydrodesulfurization process is renewed due to absorption of hydrogen by the iron group metal oxide and for obtaining more prolonged contact between the hydrocarbon and the iron group metal oxide which comprises bringing the system to substantially the operating pressure after the contact agent has been regenerated by introducing a readily liquefiable low boiling saturated hydrocarbon gas into the chamber containing the regenerated contact comprising substantially the iron group metal oxide, and when substantially the desired pressure has been attained, again contacting the petroleum hydrocarbon and hydrogen-containing gas with the iron group metal oxide in the pressured-up chamber.

2. In a contact absorption hydrodesulfurization process in which a vaporous high boiling petroleum hydrocarbon containing sulfur, and hydrogen-containing gas under pressure are passed together through a chamber containing a contact agent comprising substantially an iron group metal oxide on a carrier, which contact agent absorbs the sulfur content of the petroleum hydrocarbon with a concomitant conversion of the iron group metal oxide into iron group metal sulfide, following which the contact agent is regenerated to substantially its original form and the contact absorption hydrodesulfurization process renewed, the improvement for avoiding pressure drops and surges when the contact absorption hydrodesulfurization process is renewed due to absorption of the hydrogen by the iron group metal oxide and for obtaining more prolonged contact between the hydrocarbon and the iron group metal oxide which comprises bringing the system to substantially the operating pressure after the contact agent has been regenerated by introducing a readily liquefiable low boiling saturated hydrocarbon gas into the chamber containing the regenerated contact comprising substantially iron group metal oxide, then when substantially the desired pressure has been attained, bringing the system on-stream by introducing the vapors of the high boiling petroleum hydrocarbon and hydrogen-containing gas into the chamber, and maintaining a partial pressure of the readily liquefiable low boiling saturated hydrocarbon gas in the system during an appreciable portion of the initial stage of the on-stream period.

3. In a contact absorption hydrodesulfurization process in which a vaporous high boiling petroleum hydrocarbon containing sulfur, and hydrogen-containing gas under pressure are passed together through a chamber containing a contact agent comprising substantially an iron group metal oxide on a carrier, which contact agent absorbs the sulfur content of the petroleum hydrocarbon with a concomitant conversion of the iron group metal oxide into iron group metal sulfide, following which the contact agent is regenerated to substantially its original form and the contact absorption hydrodesulfurization process renewed, the improvement for avoiding pressure drops and surges when the contact absorption hydrodesulfurization process is renewed due to absorption of the hydrogen by the iron group metal oxide and for obtaining more prolonged contact between the hydrocarbon and the iron group metal oxide which comprises bringing the system to substantially the operating pressure after the contact agent has been regenerated by introducing a readily liquefiable low boiling hydrocarbon gas selected from the group consisting of gases containing substantial amounts of propane, gases containing substantial amounts of butane, and gases containing mixtures of propane and butane into the chamber containing the regenerated contact comprising substantially iron group metal oxide, then when substantially the desired pressure has been attained, bringing the system on-stream by introducing the vapors of the high boiling petroleum hydrocarbon and hydrogen-containing gas into the chamber, and maintaining a partial pressure of said readily liquefiable low boiling hydrocarbon gas in the system during an appreciable portion of the initial stage of the on-stream period.

4. In a contact absorption hydrodesulfurization process whereby a vaporous high boiling petroleum hydrocarbon containing sulfur, and hydrogen-containing gas under a pressure of between about 100 and 1000 p. s. i. are passed together at a temperature in the range betwen about 750° to 950° F. through a chamber containing a contact agent comprising substantially nickel oxide on a carrier which contact agent absorbs the sulfur content of the petroleum hydrocarbon with a concomitant conversion of the nickel oxide into nickel sulfide, following which the contact agent is regenerated to substantially nickel oxide and the contact absorption hydrodesulfurization process renewed, the improvement for avoiding pressure drops and surges when the contact absorption hydrodesulfurization process is renewed due to absorption of the hydrogen by the nickel oxide and for obtaining more prolonged contact between the hydrocarbon and the iron group metal oxide, which comprises bringing the system to substantially the operating pressure after the contact agent has been regenerated by introducing a readily liquefiable low boiling hydrocarbon gas selected from the group consisting essentially of gases containing substantial amounts of propane, gases containing substantial amounts of butane and gases containing mixtures of propane and butane into the chamber containing the regenerated contact comprising substantially nickel oxides and when substantially the desired pressure has been attained, again introducing the vapors of the petroleum hydrocarbon and hydrogen-containing gas into the chamber and maintaining a partial pressure of said low boiling hydrocarbon gas in the system during an appreciable portion of the initial stage of the on-stream period.

PAUL W. CORNELL.

REFERENCES CITED

The following references are of record in the file of this patent:

UNITED STATES PATENTS

| Number | Name | Date |
|---|---|---|
| 1,944,236 | Haslam | Jan. 23, 1934 |
| 2,273,298 | Szayna | Feb. 17, 1942 |
| 2,287,672 | Fahnestock | June 23, 1942 |
| 2,337,358 | Szayna | Dec. 21, 1943 |
| 2,398,175 | Cole | Apr. 6, 1946 |